(12) United States Patent
Ahn et al.

(10) Patent No.: US 9,532,287 B2
(45) Date of Patent: Dec. 27, 2016

(54) HANDOVER APPARATUS AND METHOD FOR AVOIDING IN-DEVICE COEXISTENCE INTERFERENCE

(75) Inventors: Jae Hyun Ahn, Seoul (KR); KiBum Kwon, Seoul (KR); Myungcheul Jung, Seoul (KR)

(73) Assignee: PANTECH INC., Seoul (KR)

( * ) Notice: Subject to any disclaimer, the term of this patent is extended or adjusted under 35 U.S.C. 154(b) by 433 days.

(21) Appl. No.: 14/008,590

(22) PCT Filed: Mar. 28, 2012

(86) PCT No.: PCT/KR2012/002292
§ 371 (c)(1),
(2), (4) Date: Sep. 30, 2013

(87) PCT Pub. No.: WO2012/134178
PCT Pub. Date: Oct. 4, 2012

(65) Prior Publication Data
US 2014/0022972 A1   Jan. 23, 2014

(30) Foreign Application Priority Data
Apr. 1, 2011   (KR) ........................ 10-2011-0030411

(51) Int. Cl.
H04B 15/00   (2006.01)
H04W 24/00   (2009.01)
(Continued)

(52) U.S. Cl.
CPC ......... *H04W 36/20* (2013.01); *H04W 36/0033* (2013.01); *H04W 36/0072* (2013.01);
(Continued)

(58) Field of Classification Search
USPC ....................................................... 370/311
See application file for complete search history.

(56) References Cited

U.S. PATENT DOCUMENTS

| 8,867,450 B2 | 10/2014 | Lee et al. |
| 2010/0142485 A1 | 6/2010 | Lee et al. |

(Continued)

FOREIGN PATENT DOCUMENTS

| KR | 10-2009-0017379 | 2/2009 |
| KR | 10-2010-0119468 | 11/2010 |

(Continued)

OTHER PUBLICATIONS

International Search Report issued on Oct. 25, 2012 in International Application PCT/KR2012/002292.

(Continued)

*Primary Examiner* — Steven H Nguyen
*Assistant Examiner* — Sithu Ko
(74) *Attorney, Agent, or Firm* — H.C. Park & Associates, PLC

(57) ABSTRACT

The present disclosure relates to a handover apparatus and method capable of avoiding in-device coexistence interference. In order to prevent handover failure due to in-device coexistence interference, an SeNB provides TDM information (including TDM pattern information or TDM activation information) to a UE during a handover procedure, and the UE performs the handover with a TeNB according to the provided TDM information. By the disclosure, the UE can perform ISM signal transmission/reception and LTE signal transmission/reception with the TeNB in a discriminated manner according to a particular TDM pattern, so as to prevent handover failure due to the in-UE coexistence interference.

13 Claims, 11 Drawing Sheets

(51) Int. Cl.
*H04W 36/20* (2009.01)
*H04W 36/00* (2009.01)
*H04W 72/12* (2009.01)
*H04W 88/06* (2009.01)

(52) U.S. Cl.
CPC .... *H04W 36/0077* (2013.01); *H04W 72/1215* (2013.01); *H04W 88/06* (2013.01)

(56) References Cited

U.S. PATENT DOCUMENTS

| | | |
|---|---|---|
| 2010/0254351 A1 | 10/2010 | Wang et al. |
| 2011/0051684 A1* | 3/2011 | Li .................... H04W 36/20 370/331 |
| 2011/0128934 A1 | 6/2011 | Lee et al. |
| 2012/0020231 A1* | 1/2012 | Chen .................... H04W 36/08 370/252 |
| 2012/0207040 A1* | 8/2012 | Comsa ............. H04W 72/1215 370/252 |
| 2012/0214489 A1* | 8/2012 | Koo .................. H04W 36/0083 455/436 |
| 2015/0319653 A1 | 11/2015 | Wang et al. |

FOREIGN PATENT DOCUMENTS

| | | |
|---|---|---|
| KR | 10-2011-0025858 | 3/2011 |
| WO | 2007/149509 | 12/2007 |
| WO | 2010/126340 | 4/2010 |

OTHER PUBLICATIONS

Enhancement of FDM solution and HO, Research in Motion UK Limited, Feb. 15, 2011, pp. 1-4, Taipei, Taiwan.
Framework and procedure of in-device coexistence Interference avoidance, CMCC, Jan. 11, 2011, pp. 1-6, Dublin, Ireland.

* cited by examiner

HANDOVER APPARATUS AND METHOD FOR AVOIDING IN-DEVICE COEXISTENCE INTERFERENCE

CROSS-REFERENCE TO RELATED APPLICATIONS

This application is the National Stage Entry of International Application PCT/KR2012/002292, filed on Mar. 28, 2012, and claims priority from and the benefit of Korean Patent Application No. 10-2011-0030411, filed on Apr. 1, 2011, both of which are incorporated herein by reference in their entireties for all purposes as if fully set forth herein.

BACKGROUND

Field

The present invention relates to a wireless communication system, and more particularly, to a handover apparatus and a handover method capable of avoiding in-device coexistence interference.

Discussion of the Background

With the development of communication systems, consumers including companies and individuals require wireless communication terminals supporting various services.

Current mobile communication systems, such as 3GPP (3rd Generation Partnership Project), LTE (Long Term Evolution), and LTE-A (LTE Advanced), are requiring development of technology for a high-speed large-capacity communication system, which can transmit or receive various data, such as images and wireless data, beyond the capability of mainly providing a voice service, and can transmit data in a large capacity such as that transmitted in a wired communication network. Moreover, the current mobile communication systems are inevitably requiring a proper error detection scheme, which can minimize the reduction of information loss and improve the system transmission efficiency, thereby improving the system performance.

In this regard, a terminal apparatus, i.e. a User Equipment (UE) apparatus, or an evolved Node-B (eNB) apparatus is required to be simultaneously provided with various types of modules for supporting various types of wireless communication schemes or systems. Actually, a UE or eNB apparatus is simultaneously provided with various modules, which include not only long range wireless communication modules, such as LTE (including LTE antenna, LTE RF device, and LTE baseband device), but also short range wireless communication modules, such as Bluetooth and Wi-Fi, and modules for receiving Global Positioning Service (GPS) signals.

Such a simultaneous use of various modules may cause data transmission or reception in one particular module to act as an interference to data transmission or reception in another module, which can be expressed as an "in-device coexistence interference". The following discussion employs a UE as an example of a communication device. Therefore, the in-device coexistence interference may be also expressed as "in-UE coexistence interference".

In order to avoid such in-UE coexistence interference, various schemes are being discussed. However, when a UE performs a handover from a source eNB to a target eNB, such in-UE coexistence interference may cause a handover failure or a Radio Link Failure (RLF). Therefore, there have been requirements for solving this problem, but there have been no discussions thereon yet.

Therefore, the present disclosure is intended to present a handover process capable of avoiding occurrence of an RLF or a handover failure due to in-UE coexistence interference.

SUMMARY

An exemplary embodiment of the present invention is to provide a handover apparatus and a handover method in a wireless communication system.

Another exemplary embodiment of the present invention is to provide an apparatus and a method capable of avoiding in-device coexistence interference in a wireless communication system.

Another exemplary embodiment of the present invention is to provide a handover apparatus and a handover method capable of avoiding in-device coexistence interference in a wireless communication system.

Another exemplary embodiment of the present invention is to provide a technology for transmitting Time Division Multiplexing (TDM) activation information or TDM pattern information capable of avoiding in-device coexistence interference to a UE by an eNB at the time of handover.

Another exemplary embodiment of the present invention is to provide an apparatus and a method for performing a process of setting a Random Access Channel (RACH) including TDM pattern information.

Another exemplary embodiment of the present invention is to provide an apparatus and a method for transmitting a Radio Resource Control (RRC) connection reconfiguration message including TDM pattern information.

Another exemplary embodiment of the present invention is to provide an apparatus and a method for performing an RRC connection reconfiguration process including TDM pattern information.

Another exemplary embodiment of the present invention is to provide an apparatus and a method for transmitting and receiving data according to TDM pattern information.

An exemplary embodiment of the present invention provides a handover method of a UE for avoiding in-device coexistence interference, which includes: receiving an RRC connection reconfiguration message including TDM information for avoiding in-UE coexistence interference from a handover Source eNB (SeNB); and performing a handover operation based on the TDM information with a target eNB (TeNB) based on the TDM information.

Another exemplary embodiment of the present invention provides a handover method of an SeNB for avoiding in-UE coexistence interference, which includes: generating an RRC connection reconfiguration message including TDM information for avoiding in-UE coexistence interference; and transmitting the RRC connection reconfiguration message including the TDM information to a UE to be handovered.

Another exemplary embodiment of the present invention provides a handover method of a TeNB for avoiding in-UE coexistence interference, which includes: receiving a contention-free random access preamble from a UE to be handovered; and performing a handover procedure with the UE according to particular TDM information for avoiding in-UE coexistence interference.

Another exemplary embodiment of the present invention provides a handover apparatus for avoiding in-UE coexistence interference, which includes: an RRC connection reconfiguration message receiver for receiving an RRC connection reconfiguration message from an SeNB for handover; a TDM determiner for determining whether the RRC connection reconfiguration message includes TDM information for avoiding in-UE coexistence interference; an RA execution unit for performing a random access with the SeNB; and a transceiver for performing a handover between the SeNB and a TeNB based on the TDM information.

Another exemplary embodiment of the present invention provides an SeNB apparatus for performing a handover for avoiding in-UE coexistence interference, which includes: an RRC connection reconfiguration message generator for, when a TDM operation is necessary in order to avoid in-UE coexistence interference, generating an RRC connection reconfiguration message including TDM pattern information or TDM activation information; and a message transmitter for transmitting the generated RRC connection reconfiguration message to the UE.

Another exemplary embodiment of the present invention provides a TeNB apparatus for performing a handover for avoiding in-UE coexistence interference, which includes: an RA processor for receiving a contention-free random access preamble from a UE to be handovered; a TDM determiner for determining whether to perform a TDM operation between the TeNB apparatus and a corresponding UE, an access grant processor for generating an access grant message according to predetermined TDM information and transmitting the generated access grant message to the UE, and a transceiver for receiving an RRC connection reconfiguration complete message from the UE according to a predetermined TDM pattern.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE ILLUSTRATED EMBODIMENTS

Figure 1:
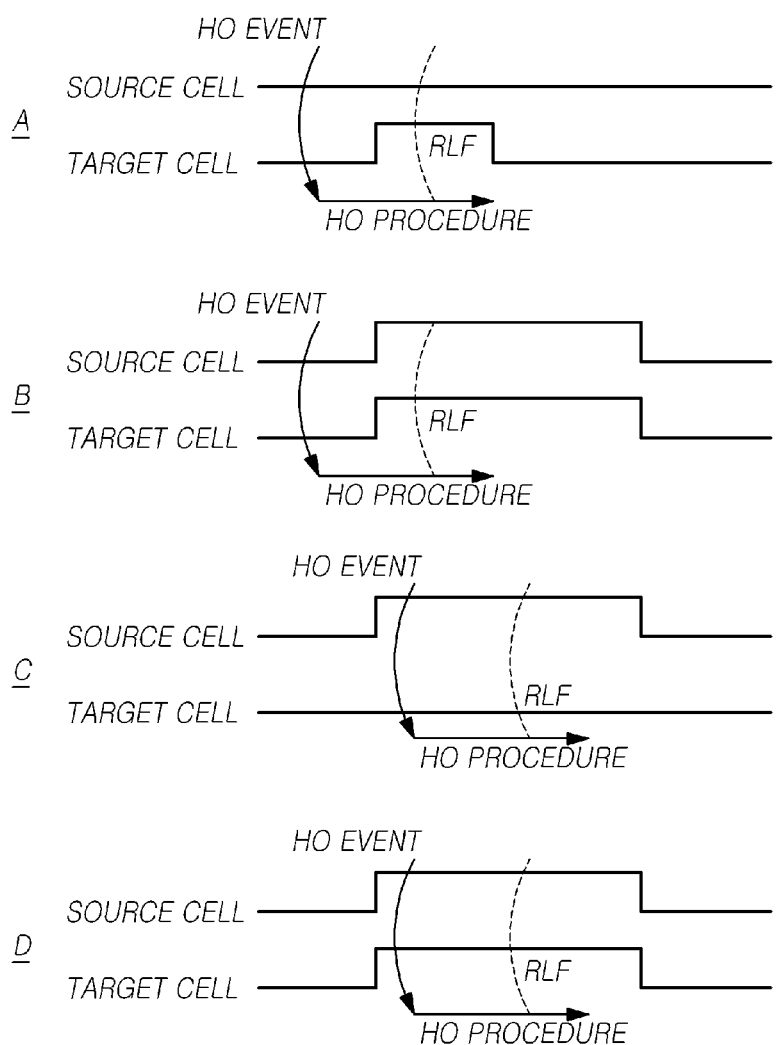
FIG. 1 illustrates examples of RLF which may occur due to in-UE coexistence interference.

Hereinafter, exemplary embodiments of the present invention will be described with reference to the accompanying drawings. In the following description, the same elements will be designated by the same reference numerals although they are shown in different drawings. Further, in the following description, detailed explanation of known related functions and constitutions may be omitted so as to avoid unnecessarily obscuring the subject manner of the present invention. (PCT)

A wireless communication system is a system for providing various communication services, such as voice and packet data, and includes a UE, usually implying a terminal, and an eNB corresponding to a transmitter side or cell.

A terminal or UE used herein has a general concept including a user terminal in a wireless communication, and should be interpreted as a concept including all of a Mobile Station (MS) in a Global System for Mobile Communication (GSM), a User Terminal (UT), a Subscriber Station (SS), and a wireless device, as well as UE in Wide Code Division Multiple Access (WCDMA), Long-Term Evolution (LTE), and High Speed Packet Access (HSPA).

In general, an eNB corresponds to a device, a function or a particular area communicating with a UE, and may be referred to by another name, such as Node-B, evolved Node-B, sector, site, Base Transceiver System (BTS), Access Point (AP), relay node, or Remote Radio Head (RRH).

In other words, in the present specification, the eNB should be interpreted as having a comprehensive meaning, which includes not only the eNB itself of the LTE, but also both an area covered by each transmission side or cell, such as Node B of the WCDMA or Base Station Controller (BSC) of the CDMA, and a device or hardware/software for controlling the area, and may be used as the same concept as a mega cell, a macro cell, a micro cell, a pico cell, a femto cell, a relay node, or an RRH.

In order to satisfy the user service requirements according to high speed data support, a wireless communication system to which the present invention is applied supports a plurality of component Carriers (CCs). Further, the wireless communication system supports a Carrier Aggregation (CA) function, which groups a plurality of CCs and uses them as one system band. That is, the CA refers to a scheme of collectively using a plurality of frequency bands for transmission by one communication apparatus.

Here, in the case of using the CA as described above, a transmission area including a combination of a downlink CC and an uplink CC may be defined as a cell. Further, among the cells as defined above, a cell providing a service to the device is called a serving cell.

In the case of FDD, a cell may be configured by a combination of one or more downlink CCs and one or more uplink CCs. Also, in the case of FDD, the cell may be configured by only one or more downlink CCs. In the case of TDD, a cell may have a form in which one CC includes both uplink transmission and downlink transmission.

In the present specification, the term eNB is used as a representative of a transmitter side or cell. However, the present invention is not limited to such use, and the eNB should be construed as a comprehensive concept implying all types of wireless communication apparatuses transmitting or receiving data to or from a terminal or UE as described above.

There is no limit in the multiple access schemes applicable to the wireless communication system.

That is, the wireless communication system may employ various multiple access schemes, such as a Code Division Multiple Access (CDMA) scheme, a Time Division Multiple Access (TDMA) scheme, a Frequency Division Multiple Access (FDMA) scheme, an Orthogonal Frequency Division Multiple Access (OFDMA) scheme, an OFDM-FDMA scheme, an OFDM-TDMA scheme, and an OFDM-CDMA scheme.

Uplink transmission and downlink transmission may employ a Time Division Duplex (TDD) scheme of transmitting data in different times, a Frequency Division Duplex (FDD) scheme of transmitting data by using different frequencies, or a Hybrid Division Duplex (HDD) scheme corresponding to a hybrid scheme of the two schemes.

The embodiment of the present invention may be applied to resource allocation in an asynchronous wireless communication evolved to the Long Term Evolution (LTE) and the LTE-Advanced (LTE-A) from the GSM, the WCDMA, and HAPA and a synchronous wireless communication evolved to the CDMA, the CDMA-2000, and the Ultra Mobile Broadband (UMB). The present invention is not limited to a specific wireless communication field and should be interpreted to include all technical fields to which the spirit of the present invention can be applied.

Meanwhile, as described above, each of recent UEs and eNBs is required to be simultaneously equipped with a plurality of modules for supporting various types of wireless communication schemes or systems, and an actual UE or eNB is simultaneously equipped with various modules, which include not only long range wireless communication modules (including antenna, LTE RF, and LTE baseband device), but also short range wireless communication modules, such as Bluetooth and Wi-Fi, and other modules, such as a GPS receiving module.

That is to say, one UE or eNB simultaneously includes a GPS module, including a GPS antenna, a GPS RF device, and a GPS baseband device, an LTE module, including an LTE antenna, an LTE RF device, and an LTE baseband device, and a BT/Wi-Fi module, including a BT/Wi-Fi antenna, a BT/Wi-Fi RF device, and a BT/Wi-Fi baseband device. However, since the isolation between the antennas of such different modules is not perfect, interference between different types of wireless systems may occur and is called "in-device coexistence interference".

In the following discussion, an LTE module is used as an example of a long range wireless communication module, and any type of wireless communication module or wireless communication system other than the LTE module, which can generate interference to the reception Rx of the LTE module, is expressed using one term "Industrial, Scientific and Medical (ISM)", although the present invention is not limited thereto. That is, the following discussion is based on assumption that an LTE system is a first wireless communication system and another wireless communication system, such as BT, Wi-Fi, or GPS system, which may cause in-device coexistence interference to a UE supporting the first wireless communication system, is a second wireless communication system, for example, an ISM system.

Now, specific examples of in-UE coexistence interference will be described. In band #40 (2300~2400 MHz), LTE TDD downlink reception may be performed. In this band, the ISM system may generate in-UE coexistence interference to the downlink reception of the LTE system. Of course, on the contrary, in band #40 (2300~2400 MHz), LTE TDD uplink transmission may be performed, which may generate in-UE coexistence interference to the reception of the IDM modules.

In order to avoid such in-UE coexistence interference, various schemes have been discussed, which generally include a Frequency Division Multiplexing (FDM) scheme, a Time Division Multiplexing (TDM) scheme, and a Power Control (PC) scheme.

The FDM scheme is a scheme of avoiding interference by spacing frequency bands of an LTE signal and an ISM signal apart from each other, and may specifically include a scheme of spacing the frequency band of an LTE signal apart from a fixed ISM band and a scheme of spacing the ISM band away from the frequency band of the LTE signal.

Meanwhile, the PC scheme is a scheme of lowering the LTE transmission power or ISM transmission power to a predetermined level, so as to improve the reception quality of the counterpart signal, thereby avoiding the interference.

The TDM scheme is a scheme of divisionally using the temporal area (time axis) for the transmission/reception of an LTE signal and the transmission/reception of an ISM signal, so as to prevent overlapping between them in the temporal area (time axis). Specifically, a DRX based TDM scheme, an HARQ protection TDM scheme, and an autonomous denial TDM scheme are being discussed as the TDM scheme. Those three types of specific TDM schemes are described below in more detail.

The TDM scheme can be applied to a case of using one CC band also. However, since the TDM scheme is a technology divisionally using time resources, the interference may become too large or may even make the communication nearly impossible according to the type of traffic used in the UE.

Further, although the FDM scheme cannot be used in a situation using only one CC band, it is advantageous in that it can perfectly avoid the band in which the interference occurs. Therefore, unlike the TDM, the FDM can prevent the interference from increasing according to the type of the traffic.

Meanwhile, in a general communication system, when a UE moves from an SeNB, which is a serving eNB or source eNB to which the UE is currently connected, to a TeNB, which is a new or target eNB, it is necessary to perform a handover procedure. The handover procedure releases the connection to the SeNB and establishes the connection with the TeNB, so as to enable a continuous communication.

Now, the handover procedure will be briefly described. First, when a situation requiring a handover occurs, the SeNB transmits an RRC connection reconfiguration message (RRCConnectionReconfiguration) to the UE. Upon receiving the RRC connection reconfiguration message, the UE reestablishes an RRC connection with a corresponding TeNB and then transmits an RRC connection reconfiguration completion message (RRCConnectionReconfiguration-Complete) to the TeNB.

Meanwhile, RLF may occur due to various causes between the eNB and the UE, which include an out of synchronization, a failure in the RRC connection setup, a failure in the RRC connection reconfiguration, a failure in the RRC connection reestablishment, and an arrival at the maximum retransmission number of times in the Radio Link Control (RLC).

Among the causes, the failure in the RRC connection reconfiguration has a concept including a failure in the handover, and the RRC connection reconfiguration message includes mobility control information (mobilityControlInfo) when the handover fails.

Further, during the RRC connection reestablishment, the UE first transmits an RRC connection reestablishment request message (RRCConnectionReestablishmentRequest) to the eNB, and this message may include a cause value as information on the cause of the RLF. The cause value may include reconfiguration failure (ReconfigurationFailure), handover failure (HandoverFailure), and other failure (OtherFailure) according to types of the cause.

TABLE 1

Example of RRC connection reestablishment request message

```
-- ASN1START
RRCConnectionReestablishmentRequest ::= SEQUENCE {
    criticalExtensions              CHOICE {
        rrcConnectionReestablishmentRequest
                                    RRCConnectionReestablishmentRequest-IEs,
        criticalExtensionsFuture    SEQUENCE { }
    }
}
RRCConnectionReestablishmentRequest-IEs ::= SEQUENCE {
    ue-Identity                     ReestabUE-Identity,
    reestablishmentCause            ReestablishmentCause,
    spare                           BIT STRING (SIZE (2))
}
ReestabUE-Identity ::=              SEQUENCE {
    c-RNTI                              C-RNTI,
    physCellId                          PhysCellId,
    shortMAC-I                          ShortMAC-I
}
ReestablishmentCause ::=             ENUMERATED {
                                        reconfigurationFailure, handoverFailure,
                                        otherFailure, spare1 }
-- ASN1STOP
```

Now, the meaning of each cause value will be described. The handover failure (HandoverFailure), which is a cause value corresponding to the failure in the handover, implies an RLF occurring during the handover. That is, this cause value corresponds to a case in which an RLF occurs since the timer T304, started after the eNB transmits an RRC connection reconfiguration message to the UE at the time of handover, has expired. In more detail, this cause value corresponds to a case in which the RRC connection reconfiguration procedure by the RRC connection reconfiguration message including the mobility control information (mobilityControlInfo) has failed.

Next, the reconfiguration failure (ReconfigurationFailure), which is a cause value implying the reconfiguration failure, indicates a reconfiguration failure having occurred during the typical RRC connection reconfiguration process except for the handover, and the other failure (OtherFailure) corresponds to a case in which an RLF has occurred due to other problems except for the above two causes. For example, the other failure (OtherFailure) may correspond to a case in which an RLF has occurred due to out of synchronization or a case in which an RLF indicated by the RLC has occurred.

In the case in which such an RLF occurs, if the Access Stratum (AS) security has not been activated, the RRC connection is released and a corresponding cause value is set as the other failure (OtherFailure). If the AS security has been activated, the RRC connection reestablishment is performed.

Meanwhile, due to the in-UE coexistence interference as described above, an RLF may occur and handover may thus fail. FIG. 1 illustrates examples of RLF which may occur due to in-UE coexistence interference.

A of FIG. 1 corresponds to a case in which in-UE coexistence interference occurs only within a target cell. If in-UE coexistence interference as shown in A of FIG. 1 occurs during a handover procedure, the handover fails.

B of FIG. 1 corresponds to a case in which in-UE coexistence interference occurs within both a source cell and a target cell during an intra-frequency handover procedure. In this case also, the handover fails.

C of FIG. 1 corresponds to a case in which in-UE coexistence interference has already occurred only within a source cell before the handover event occurs. In this case, it is possible to consider that RLF has occurred in the source cell and the handover has failed. D of FIG. 1 corresponds to a case in which in-UE coexistence interference has already occurred within both a source cell and a target cell before the handover event occurs. This case also corresponds to handover failure.

In order to prevent handover failure due to the in-UE coexistence interference, it is necessary to apply various technologies of avoiding in-UE coexistence interference as described above during the handover procedure.

Particularly, in order to prevent handover failure due to in-UE coexistence interference, the present disclosure proposes a scheme in which an SeNB provides TDM information (including TDM pattern information and TDM activation information) to a UE and the UE performs a handover procedure and a data transmission/reception procedure with a TeNB according to the provided TDM information.

Figure 2:
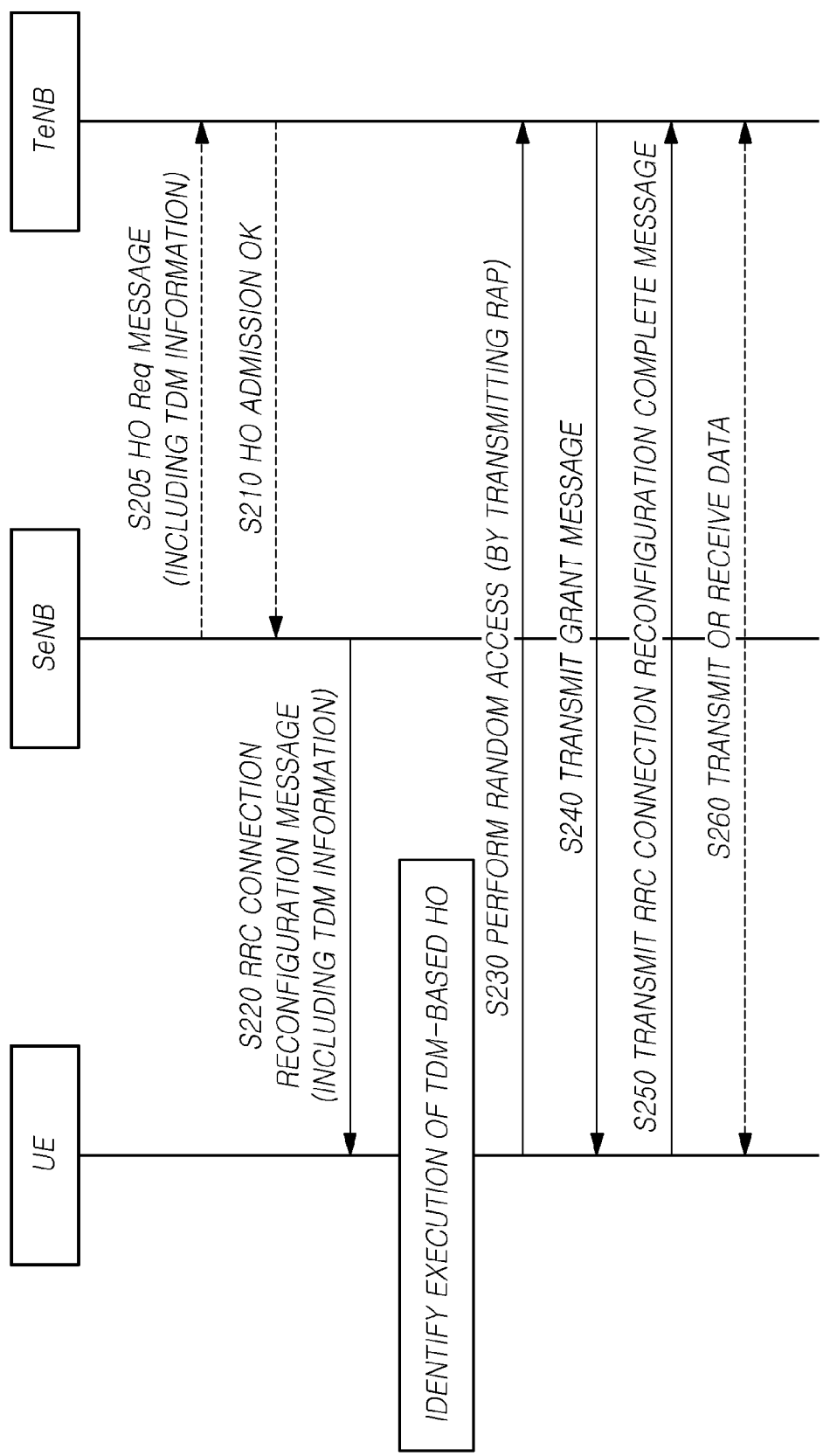
FIG. 2 is a signal flow diagram of a handover method for avoiding in-UE coexistence interference according to an embodiment of the present invention.

FIG. 2 is a signal flow diagram of a handover method for avoiding in-UE coexistence interference according to an embodiment of the present invention.

The handover method for avoiding in-UE coexistence interference according to the present embodiment may include the steps of: when there is a possibility that in-UE coexistence interference may occur, including TDM information for avoiding in-UE coexistence interference in mobility control information (mobilityControlInfo) within a RRC connection reconfiguration message (RRCConnectionReconfiguration) and then transmitting the RRC connection reconfiguration message (RRCConnectionReconfiguration) to a UE by an SeNB (step S220); performing a random access (for example, by transmitting a random access preamble) to a TeNB by the UE (step S230); transmitting an access grant message according to the TDM information to the UE by the TeNB (step S240); and transmitting an RRC connection reconfiguration message to the TeNB by the UE (step S250). Of course, after step S250, TDM data is transmitted or received between the UE and the TeNB according to the TDM information (step S260). As a result, it is possible to minimize the signal interference of an ISM module.

If necessary, the handover method may further include, before step S220, the steps of: when the SeNB transmits a handover request message to the TeNB, transmitting the TDM information to be included in the mobility control information, together with the handover request message, to the TeNB by the SeNB (step S205); and transmitting a handover admission OK message to the SeNB after identifying the TDM information by the TeNB (step S210).

Steps 205 and 210 as described above are necessary in order to previously notify the TeNB of a particular UE to be handovered to the TeNB, a requirement to perform TDM transmission/reception in order to avoid in-UE coexistence interference, and TDM information (including TDM pattern) indicating details of the TDM transmission/reception. Of course, if the TeNB previously knows the particular UE, the requirement to perform TDM transmission/reception, and the TDM information, steps S205 and S210 may be omitted.

In step S220, the TDM information for avoiding in-UE coexistence interference may be either specific TDM pattern information or TDM activation information indicating only On/Off of the TDM scheme. The TDM information for avoiding in-UE coexistence interference will be described later in more detail.

Further, although not shown, instead of transmitting the TDM information for avoiding in-UE coexistence interference when the SeNB transmits an RRC connection reconfiguration message to the UE, the TDM information for avoiding in-UE coexistence interference may be transmitted to the UE or TeNB through separate signaling.

Specifically, the step (step S230) of performing a random access to a TeNB by the UE may be, but is not limited to, a step of establishing a contention-free Random Access Channel (contention-free RACH). Further, the random access procedure in step S230 may include either only a step of transmitting a preamble or the entire random access procedure.

The establishing of the contention-free RACH refers to an operation of comparing a Cell Radio Network Temporary Identifier (C-RNTI) of the UE received from the SeNB in step S205 with the preamble allocated in step S210. In other words, in step S230, the TeNB identifies whether the preamble transmitted from the UE is identical to the preamble selected by the TeNB in step S210.

When the preamble transmitted from the UE is identical to the preamble selected by the TeNB, the TeNB recognizes the TDM pattern for the UE through the identified preamble and transmits an access grant message according to the TDM pattern to the UE in step S240. Then, the UE transmits an RRC connection reconfiguration complete message according to the TDM information in step S250, and performs a communication with the TeNB to transmit or receive data to or from the TeNB in step S260.

In this process, the operation based on the TDM pattern may not be sequentially performed from step S240. In other words, the UE may transmit data according to the TDM pattern after receiving an access grant message from the TeNB and then transmitting the RRC connection reconfiguration complete message. Therefore, in the present invention, the sequence between steps S240, S250, and S260 of the TDM-based operation may be changed and those steps may be performed at different time points according to the operations of the system and the UE.

Hereinafter, TDM pattern information as an example of the TDM information, TDM activation information, and mobility control information including the TDM pattern information and the TDM activation information will be described.

As described above, specific TDM schemes in the in-UE coexistence interference technology include a DRX based TDM scheme, an HARQ protection TDM scheme, and an autonomous denial TDM scheme.

The TDM information of the present embodiment refers to information on a specific applied TDM scheme among the various TDM schemes. More particularly, the TDM information may be either TDM pattern information or flag type TDM activation information indicating only On/Off of the TDM transmission/reception of the LTE.

Hereinafter, a specific configuration of the TDM pattern information applied to the present embodiment will be described. However, the TDM pattern information is not limited to the TDM pattern information described below and should be understood as having a concept including information on all types of TDM schemes used in order to avoid the in-UE coexistence interference.

A handover method for avoiding in-UE coexistence interference according to another embodiment of the present invention may include the following steps.

In step S205, the SeNB transmits a handover request message including a C-RNTI of the UE to the TeNB. In this event, the SeNB may include TDM pattern information of the UE in the transmitted message.

In step S210, the TeNB identifies the C-RNTI of the UE and transmits a handover admission OK message to the SeNB. In this event, since the use of the TDM pattern is not employed, the TeNB transmits a handover admission OK message including contents denying the use of the TDM pattern on the UE to the SeNB. Therefore, in step S220, the SeNB transmits an RRC connection reconfiguration message including TDM OFF information to the UE.

Then, in step S225, the UE identifies the execution of the handover. Also, the UE identifies that it is impossible to apply the TDM pattern.

Thereafter, in step S230, the UE transmits an RACH request message including an allocated preamble to the TeNB and the TeNB determines whether a preamble in the RACH request message transmitted from the UE is identical to the preamble having been allocated by the TeNB itself. In step S240, the TeNB transmits an access grant message to the UE through the identified preamble.

When the UE having received the access grant message determines that it is necessary to apply the TDM in order to avoid the in-UE coexistence interference, that is, in order to apply the TDM pattern, the UE transmits an RRC connection reconfiguration complete message including TDM pattern information or TDM request information for avoiding in-UE coexistence interference to the TeNB in step S250.

Therefore, the TeNB may identify the TDM pattern information or TDM request information included in the RRC connection reconfiguration complete message, so as to allow a TDM operation.

In other words, when the TeNB identifies that it is necessary to perform TDM of the UE after the handover of the UE even though the TeNB has identified that it is impossible to apply the TDM to the UE during the handover with the SeNB, the TeNB may identify the TDM pattern information or approval on the TDM request, so as to allow the TDM operation.

Thereafter, in step S260, the TeNB may apply the TDM pattern and transmit or receive data to or from the UE.

Figure 3:
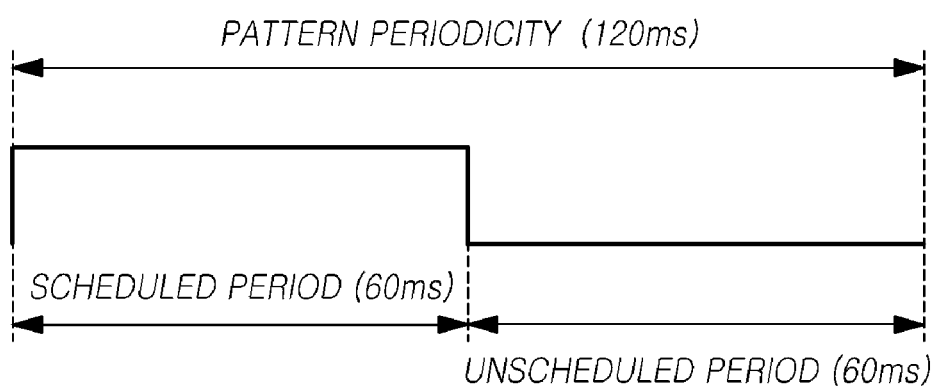
FIG. 3 illustrates a DRX-based TDM scheme, which is one of schemes for avoiding in-UE coexistence interference applicable to the present embodiment.

FIG. 3 illustrates a DRX-based TDM scheme, which is one of schemes for avoiding in-UE coexistence interference applicable to the present embodiment.

The DRX-based TDM scheme, which is one of schemes for avoiding in-UE coexistence interference, is a scheme in which a predetermined pattern periodicity is divided into a scheduled period and an unscheduled period and LTE transmission is prevented in the unscheduled period in order to avoid interference between the LTE and the ISM. However, main LTE transmission, such as random access transmission or HARQ retransmission, may be allowed even in the unscheduled period.

According to an embodiment to which handover of the DRX-based TDM scheme is applied, transmission in a preamble transmitting period and a Random Access Response (RAR) receiving period may be allowed even when the preamble transmitting period and the RAR receiving period belong to the unscheduled period. Especially, in the RAR receiving period, transmission of the ISM may be autonomously denied. The concept of autonomous denial will be described later as an embodiment applying another TDM scheme. Further, transmission of an RRC connection reconfiguration complete message for completing the handover after the PAR receiving may be especially allowed even in the unscheduled period in order to enable the message to be transmitted before the timer T304, which is a handover failure timer, expires.

In the scheduled period, transmission of the ISM is prevented while transmission of LTE is allowed, in order to avoid interference between the LTE and the ISM. Of course, similarly to the unscheduled period, an important ISM transmission, such as a beacon (in the case of Wi-Fi), may be allowed even in a corresponding scheduled period. In other words, in order to protect the important ISM transmission, the LTE transmission may be prevented even in the scheduled period.

In the case where the DRX-based TDM scheme as described above is used, the TDM pattern information of the present embodiment may include information on the pattern cycle, the length of the scheduled period, and the length of the unscheduled period, etc. Further, the TDM pattern information may include special signaling for protecting an important ISM transmission, such as a beacon, that is, may include ISM transmission protection information in the scheduled period. An example of the ISM transmission protection information in the scheduled period may include a cycle of beacon signaling and subframe offset information. The subframe offset may be determined based on that SFN=0 and radio frame number=0.

Figure 4:
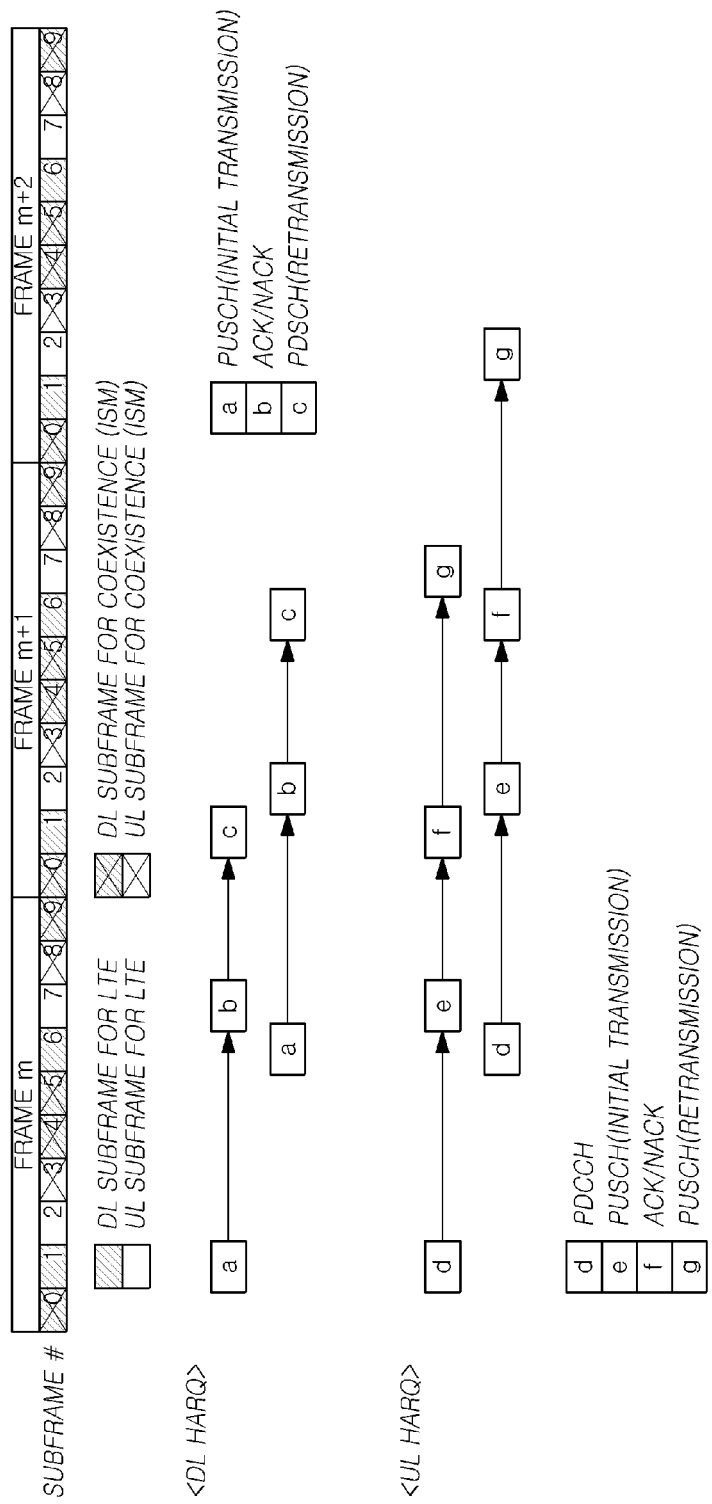
FIG. 4 illustrates an HARQ protection TDM scheme, which is one of schemes for avoiding in-UE coexistence interference applicable to the present embodiment.

FIG. 4 illustrates an HARQ protection TDM scheme, which is one of schemes for avoiding in-UE coexistence interference applicable to the present embodiment.

In the HARQ protection TDM scheme, when data is transmitted based on HARQ, a retransmitted signal is first protected, that is, an HARQ retransmission is inevitably performed.

For example, if TDM transmission is performed in order to avoid in-UE coexistence interference and retransmission is not performed, the performance of the system will be remarkably degraded. In order to solve this problem, the HARQ protection TDM scheme determines the TDM transmission pattern in consideration of the retransmission cycle.

In FIG. 4, it is assumed that, among 10 subframes within the mth radio frame, the first and sixth subframes (SFN=1 and 6) have been reserved for the downlink transmission of LTE and the second and seventh subframes (SFN=2 and 7) have been reserved for the uplink transmission of LTE (scheduled subframes).

Therefore, in the case of downlink HARQ retransmission, initial transmission of a Physical Downlink Shared Channel (PDSCH) is performed at the first subframe (SFN=1) and retransmission of the PDSCH is performed at the first subframe (SFN=1) of the (m+1)th radio frame (of course, FIG. 4 shows the configuration in which ACK/NACK information is transmitted through an uplink subframe having an SFN of 7, too).

In the HARQ protection TDM scheme as described above, subframes, scheduling of which is prevented in order to avoid in-UE coexistence interference, are not to be used for transmission of an LTE signal in order to protect an ISM band.

Similarly to the DRX-based TDM scheme, the HARQ protection TDM scheme also may prevent LTE transmission even at a subframe reserved for the transmission, in order to enable important ISM signal transmission. On the contrary, the LTE transmission may be allowed even in a subframe for coexistence, scheduling of which is prevented, when transmission of important LTE messages, such as a random access signal or a system information paging signal, is necessary.

In such TDM schemes, the TDM pattern information of the present embodiment may be configured by pattern information in the form of bitmap indicating subframe(s) for LTE. The number of subframes indicated by one bit may be either one or more than one. That is, a value obtained by multiplying the total length of the bitmap by the number of subframes indicates a cycle of the TDM pattern and the value (0 or 1) of each bit may indicate a scheduled subframe or an unscheduled subframe.

For example, if TDM pattern information having a TDM pattern cycle of 20 subframes is given as a bitmap of 1001001000 and if it is assumed that 0 indicates an unscheduled subframe (i.e. subframe, transmission of which is prevented), each bit in the TDM pattern information implies two consecutive subframes and subframes having SFNs of 0, 1, 6, 7, 12, and 13 (SFN=0, 1, 6, 7, 12, 13) in the TDM pattern cycle correspond to scheduled subframes, which are subframes for the uplink or downlink transmission of LTE.

Of course, each bit on the TDM pattern information may imply more than two consecutive subframes. For example, one bit may include information on 4, 5, or 10 consecutive subframes. In this event, TDM pattern information having a TDM pattern cycle of 20 subframes may be bitmap information of 5, 4, or 2 bits.

Figure 5:
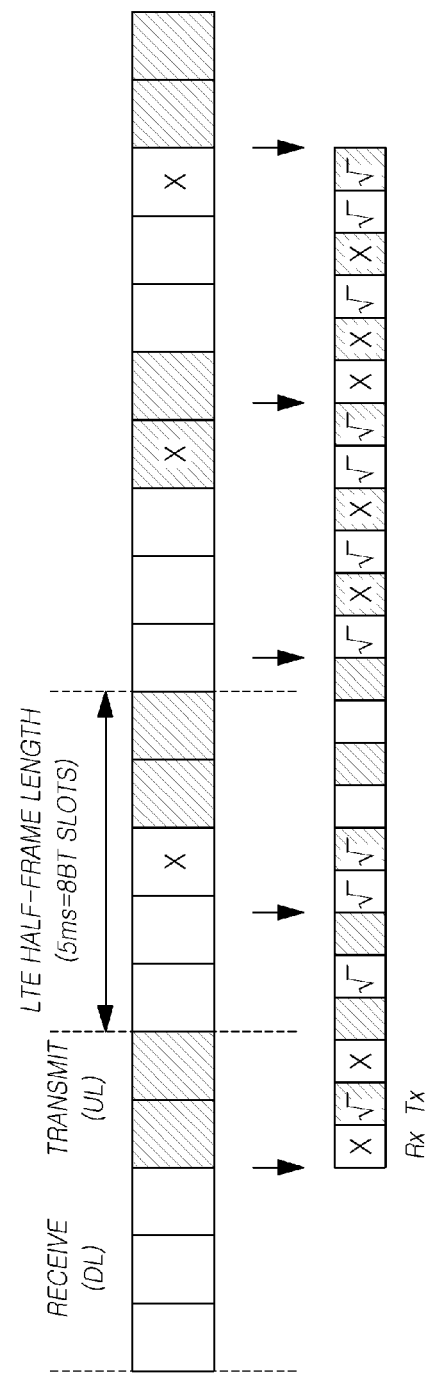
FIG. 5 illustrates an autonomous denial TDM scheme, which is one of schemes for avoiding in-UE coexistence interference applicable to the present embodiment.

FIG. 5 illustrates an autonomous denial TDM scheme, which is one of schemes for avoiding in-UE coexistence interference applicable to the present embodiment.

The autonomous denial TDM scheme is a scheme in which a UE denies transmission of a predetermined signal in order to protect ISM reception in the case of LTE or in order to protect LTE reception in the case of ISM.

FIG. 5 corresponds to an example of denying a predetermined LTE signal in order to protect the reception of an ISM signal, wherein even when an eNB has allocated an uplink transmission to a UE, the UE denies the allocation and does not perform the uplink transmission in order to protect the reception of an ISM signal.

In FIG. 5, the upper subframe structure corresponds to reception and transmission of an LTE signal and the lower structure corresponds to reception and transmission of an ISM signal.

In more detail, at the eighth subframe of LTE, reception is denied since the reception may be subjected to interference by the transmission of an ISM signal. Meanwhile, at the 14th subframe of LTE, transmission is denied in order not to have an influence on the reception of an ISM signal. Likewise, in the ISM also, a case where there is a difficulty in the reception due to interference of LTE or a case where the ISM transmission or reception is denied in order to protect the LTE reception are marked by "X" in the subframes of the lower structure of FIG. 5.

Meanwhile, the TDM pattern information according to an embodiment of the present invention as shown in FIGS. 3 to 5 may be included in the mobility control information (mobilityControlInfo) transmitted from the SeNB to the UE in step S220. Otherwise, the TDM pattern information may be included in the RRC connection reconfiguration complete message including the TDM pattern information transmitted from the UE to the TeNB in step S250.

Tables 2 and 3 below are an example of mobility control information including TDM information according to an embodiment of the present invention, wherein Table 2 corresponds to an example of mobility control information including TDM pattern information and Table 3 corresponds to an example of mobility control information including TDM activation information.

various types of TDM schemes as described above. For example, when there is an existing TDM scheme, it is possible to apply the existing TDM scheme between the UE and the TeNB. That is, it is possible to use the existing TDM scheme in the handover procedure without change.

TABLE 2

Mobility control information including TDM pattern information

```
-- ASN1START
MobilityControlInfo ::=    SEQUENCE {
    targetPhysCellId          PhysCellId,
    carrierFreq               CarrierFreqEUTRA          OPTIONAL,
    -- Cond HO-toEUTRA
    carrierBandwidth          CarrierBandwidthEUTRA     OPTIONAL,
    -- Cond HO-toEUTRA
    additionalSpectrumEmission  AdditionalSpectrumEmission  OPTIONAL,
    -- Cond HO-toEUTRA
    t304                      ENUMERATED {
                                ms50, ms100, ms150, ms200, ms500, ms1000,
                                ms2000, spare1},
    newUE-Identity            C-RNTI,
    radioResourceConfigCommon RadioResourceConfigCommon,
    rach-ConfigDedicated      RACH-ConfigDedicated      OPTIONAL,
    tdmIcoPattern             TDMICOPattern             OPTIONAL,
    -- Need OP
    ...
}
```

In the example of mobility control information of Table 2, the value "tdmIcoPattern" corresponds to the TDM pattern information of the present embodiment, and the TDM pattern information may be determined according to the schemes shown in FIGS. 3 to 5. The UE transmits and receives LTE data to and from the TeNB according to the received TDM pattern. As a result, it is possible to prevent handover failure due to in-UE coexistence interference.

As another example, when there is a TDM pattern transferred to the TeNB in the handover procedure through separate signaling and the UE recognizes the transferred TDM pattern, even only a TDM activation indication based on the TDM activation can enable TDM transmission or reception by a corresponding TDM pattern.

As another example, when there is a TDM pattern determined in advance as a default, even only a TDM activation

TABLE 3

Mobility control information including TDM activation information

```
-- ASN1START
MobilityControlInfo ::=    SEQUENCE {
    targetPhysCellId          PhysCellId,
    carrierFreq               CarrierFreqEUTRA          OPTIONAL,
    -- Cond HO-toEUTRA
    carrierBandwidth          CarrierBandwidthEUTRA     OPTIONAL,
    -- Cond HO-toEUTRA
    additionalSpectrumEmission  AdditionalSpectrumEmission  OPTIONAL,
    -- Cond HO-toEUTRA
    t304                      ENUMERATED {
                                ms50, ms100, ms150, ms200, ms500, ms1000,
                                ms2000, spare1},
    newUE-Identity            C-RNTI,
    radioResourceConfigCommon RadioResourceConfigCommon,
    rach-ConfigDedicated      RACH-ConfigDedicated      OPTIONAL,
    tdmIco                    ENUMERATED {TRUE, FALSE)  OPTIONAL,
    -- Need OP
    ...
}
```

In the example of mobility control information of Table 3, the value "ENUMERATED{TRUE, FALSE}" of the item "tdmIco" corresponds to the TDM activation information of the present embodiment, and the TDM activation information functions as an On/Off type indicator indicating whether to perform a TDM operation at the time of handover in order to avoid in-UE coexistence interference. For example, the value "TRUE" may be used to command the execution of a special TDM operation during the handover procedure.

In the case of using the TDM activation information indicating only on/off of the TDM in order to avoid the in-UE coexistence interference, the UE may implement indication based on the TDM activation can enable TDM transmission or reception by a corresponding TDM pattern.

By using the handover procedure as described above, when there is in-UE coexistence interference, transmission and reception of an LTE signal are performed according to a predetermined TDM pattern between a UE and a TeNB in order to avoid the in-UE coexistence interference, so as to prevent handover failure due to the in-UE coexistence interference.

Figure 6:
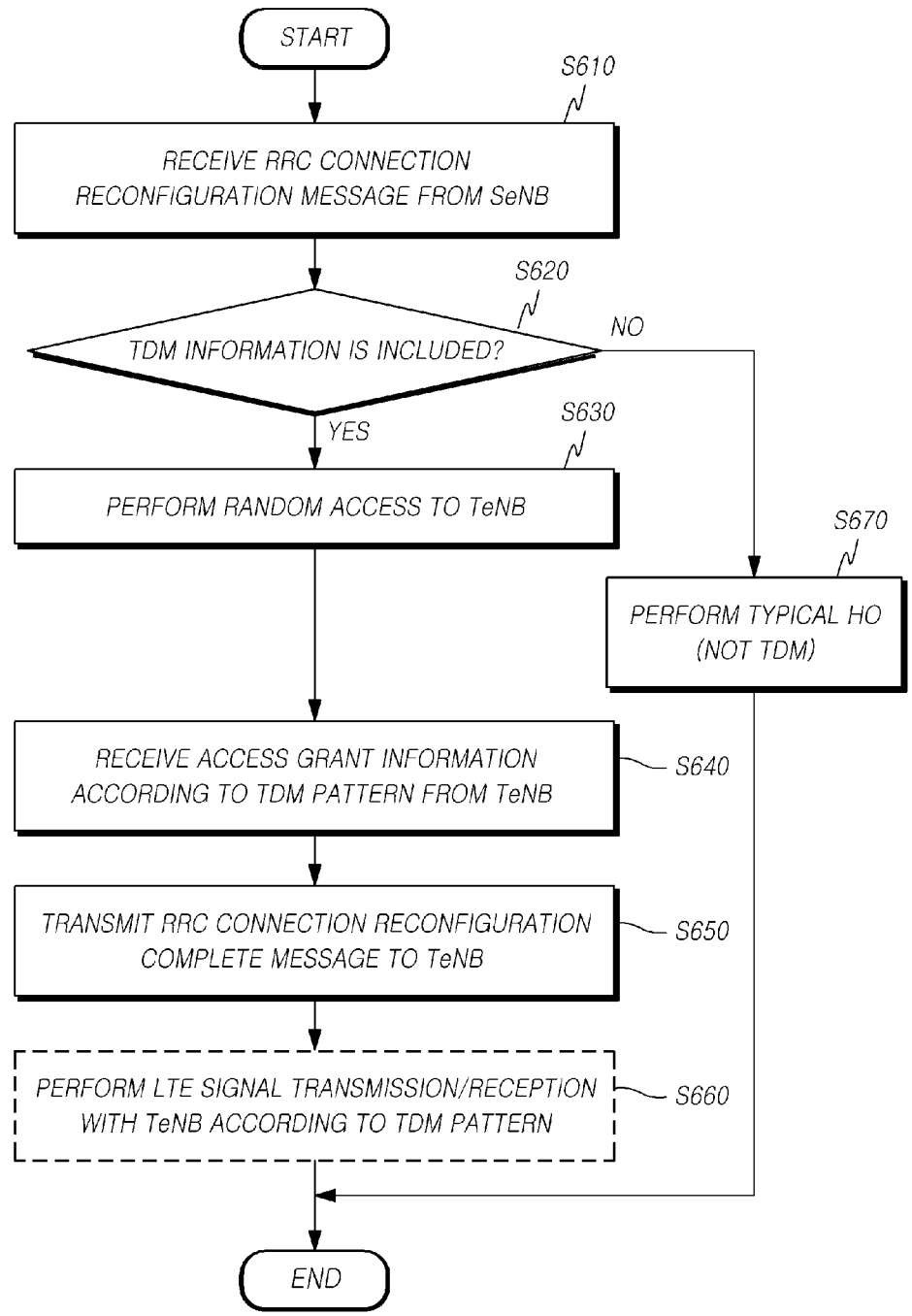
FIG. 6 is a flowchart of an operation of a UE during a handover procedure according to an embodiment of the present invention.

FIG. 6 is a flowchart of an operation of a UE during a handover procedure according to an embodiment of the present invention.

First, the UE receives an RRC connection reconfiguration message from an SeNB (step S610).

Next, the UE determines whether the RRC connection reconfiguration message includes TDM information for avoiding in-UE coexistence interference (step S620).

The TDM information for avoiding in-UE coexistence interference may be TDM pattern information as shown FIGS. 3 to 5 or TDM activation information indicating On/Off of the TDM operation. The TDM information may be included in, but is not limited to, the mobility control information within the RRC connection reconfiguration message.

When the TDM information is included in the RRC connection reconfiguration message, the UE identifies the TDM information to recognize that it should perform a TDM operation with the TeNB at the time of handover, and then performs a random access to the TeNB (step S630). For example, the UE may perform a contention-free RACH.

After performing the random access to the TeNB, the UE performs data transmission and reception with the TeNB according to a corresponding TDM pattern.

As described above, the random access procedure may include either the entire contention-free RACH access procedure or only the process of transferring a random access preamble for the RACH.

When the RACH procedure includes only the process of transferring a random access preamble, the UE may perform the procedure after the transmission of the random access preamble among the RACH procedure according to the TDM pattern directly after transmitting the random access preamble.

After receiving access grant information according to a corresponding TDM pattern from the TeNB (step S640), the UE transmits an RRC connection reconfiguration complete message (RRCConnectionReconfigurationComplete) to the TeNB (step S650).

After the handover is completed as described above, the UE performs data transmission and reception with the TeNB according to a corresponding TDM pattern (step S660).

Of course, when TDM information is not included in the RRC connection reconfiguration message, the UE performs a typical handover operation (step S670).

The typical handover operation in step S670 refers to a handover procedure, such as receiving of an access grant or a random access with a typical TeNB, which does not reflect the TDM. Further, even after the handover, the UE performs data transmission and reception with the TeNB according to a typical process without performing the TDM transmission and reception in consideration of the in-UE coexistence interference.

Meanwhile, according to another embodiment of the present invention, the handover of step S670 may be performed as follows.

The UE receives the RRC connection reconfiguration message from the SeNB and identifies the execution of the handover. This state corresponds to a case in which the handover of the UE has been normally performed between the SeNB and the TeNB and the SeNB transmits an RRC connection reconfiguration message, which does not include a TDM pattern, or an RRC connection reconfiguration message, which includes TDM activation information indicating TDM OFF, to the UE. Therefore, the UE identifies that it is impossible to apply the TDM pattern. Thereafter, the UE transmits an RACH request message including an allocated preamble to the TeNB and then receives an access grant message from the TeNB.

Upon receiving the access grant message, the UE identifies that it is necessary to apply the TDM in order to avoid in-UE coexistence interference within the UE itself, and may transmit an RRC connection reconfiguration complete message including TDM pattern information and/or TDM request information indicating the application of the TDM pattern to the TeNB. Then, the TeNB identifies the TDM pattern information or TDM request information included in the RRC connection reconfiguration complete message and then grants or allows the TDM operation. Therefore, the UE can apply the TDM pattern to transmit or receive data to or from the TeNB.

Figure 7:
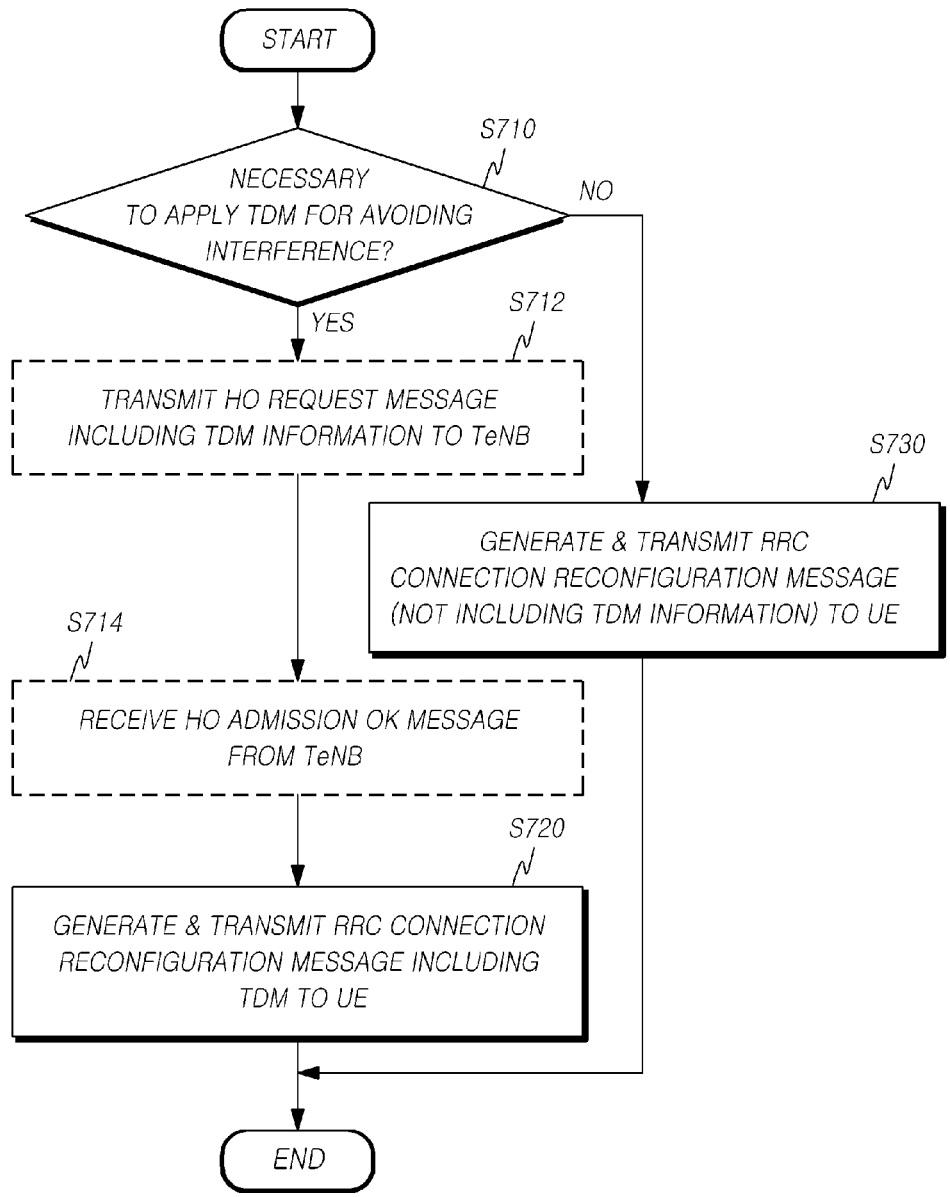
FIG. 7 is a flowchart of an operation of the SeNB during a handover procedure according to an embodiment of the present invention.

FIG. 7 is a flowchart of an operation of the SeNB during a handover procedure according to an embodiment of the present invention.

The SeNB determines whether there is a possibility that the handover may fail due to the in-UE coexistence interference (step S710). When it is necessary to avoid the in-UE coexistence interference, the SeNB generates an RRC connection reconfiguration message including TDM information (including TDM pattern information or TDM activation information) according to the embodiments described above and transmits the generated RRC connection reconfiguration message to the UE (step S720).

Of course, when there is no possibility that the handover may fail or when the in-UE coexistence interference is not taken into consideration, the SeNB generates a typical RRC connection reconfiguration message (which does not include TDM information) and transmits the generated RRC connection reconfiguration message to the UE (step S730).

Further, if necessary, before performing step S720, the SeNB may transmit a handover request message, including the same TDM information as the TDM information to be transmitted to the UE, to the TeNB (step S712), and may receive a handover admission OK message, as a response to the transmitted handover request message, from the TeNB (step S714).

The TDM information (TDM pattern information or TDM activation information) transmitted from the SeNB to the UE may be included in, but is not limited to, the mobility control information within the RRC connection reconfiguration message.

Figure 8:
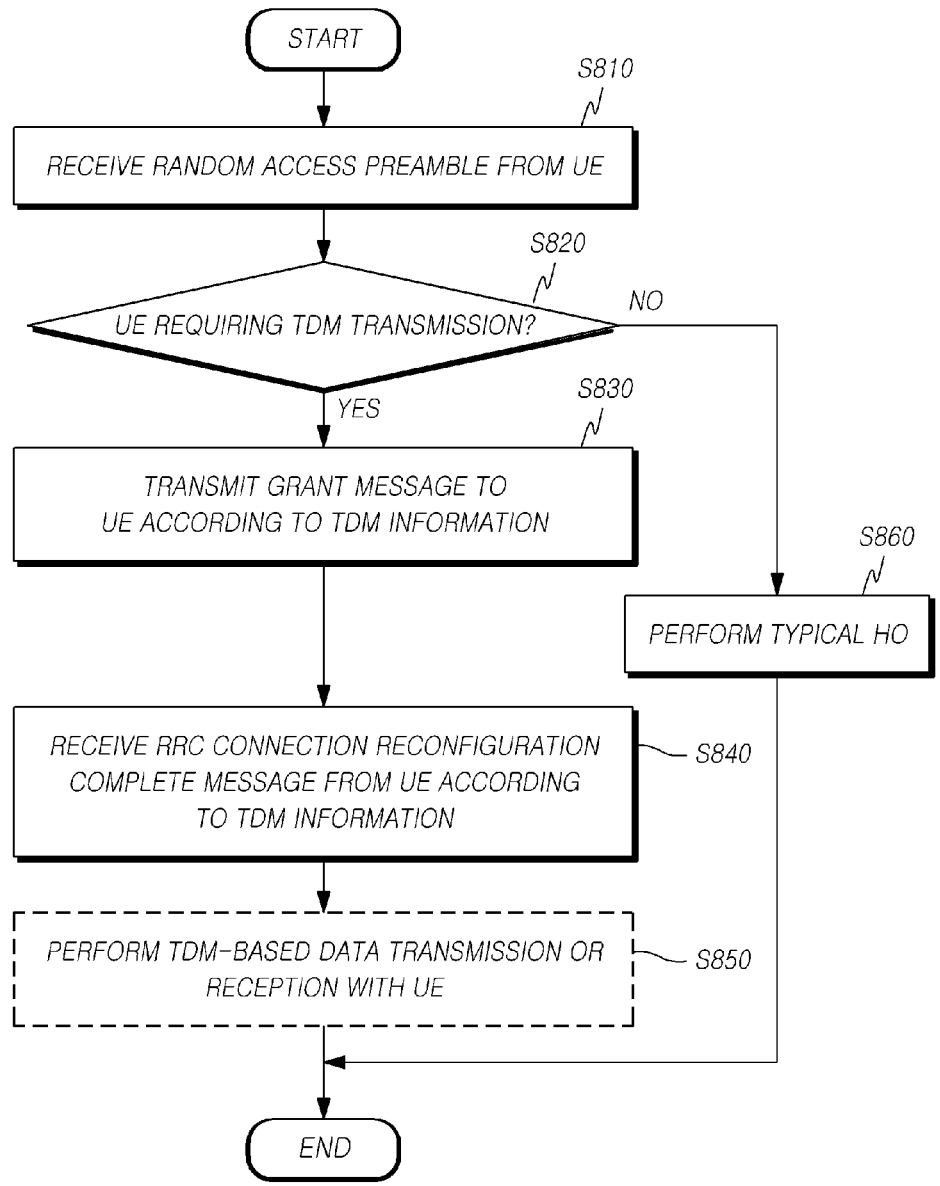
FIG. 8 is a flowchart of an operation of a TeNB during a handover procedure according to an embodiment of the present invention.

FIG. 8 is a flowchart of an operation of a TeNB during a handover procedure according to an embodiment of the present invention.

The TeNB receives a contention-free random access preamble transmitted through a random access by a UE during a handover procedure (step S810).

Then, the TeNB identifies the received random access preamble, so as to determine whether the UE is a UE requiring TDM transmission (step S820). The determination of whether the UE is a UE requiring TDM transmission can be performed by identifying the TDM pattern information and the C-RNTI of the UE received from the SeNB before the handover and determining whether the received random access preamble is a random access preamble relating to the C-RNTI of the UE allocated by the TeNB itself. That is, the TeNB identifies or determines whether the random access preamble of the UE is a random access preamble previously allocated by itself.

When it is necessary to perform a TDM operation in order to avoid in-UE coexistence interference between the TeNB and the UE to be handovered, the TeNB performs a Random Access Response (RAR) by transmitting an access grant message according to predetermined TDM information (step S830).

Next, the TeNB receives an RRC connection reconfiguration complete message from the UE (step S840), and then performs TDM-based data transmission or reception with the UE (step S850).

Further, according to another embodiment of the present invention, the TeNB may receive an RRC connection reconfiguration complete message including TDM request information or TDM pattern information from the UE in step S840.

In other words, the UE recognizes that it is necessary to apply the TDM in order to avoid in-UE coexistence interference of itself, and transmits an RRC connection reconfiguration complete message including TDM request information requesting application of the TDM or TDM pattern information required for the application of the TDM to the TeNB, and the TeNB identifies the TDM request information or the TDM pattern information included in the RRC connection reconfiguration complete message and grants the TDM operation.

Of course, as a result of the determination in step S820, when it is not necessary to perform a TDM operation in order to avoid in-UE coexistence interference between the UE and itself, the TeNB performs a typical handover procedure (step S860).

The typical handover procedure includes operations of receiving a Random Access Response (RAR), which is not based on the TDM, receiving an RRC connection reconfiguration complete message, and transmitting and receiving data to and from the UE in a state which is not applied to the TDM.

Further, although not shown, the operation of the TeNB shown in FIG. 8 may further include a step in which the TeNB receives and stores TDM information (including TDM pattern information or TDM activation information) on a particular UE when receiving the handover request message from the SeNB or the UE or through another signaling.

Figure 9:
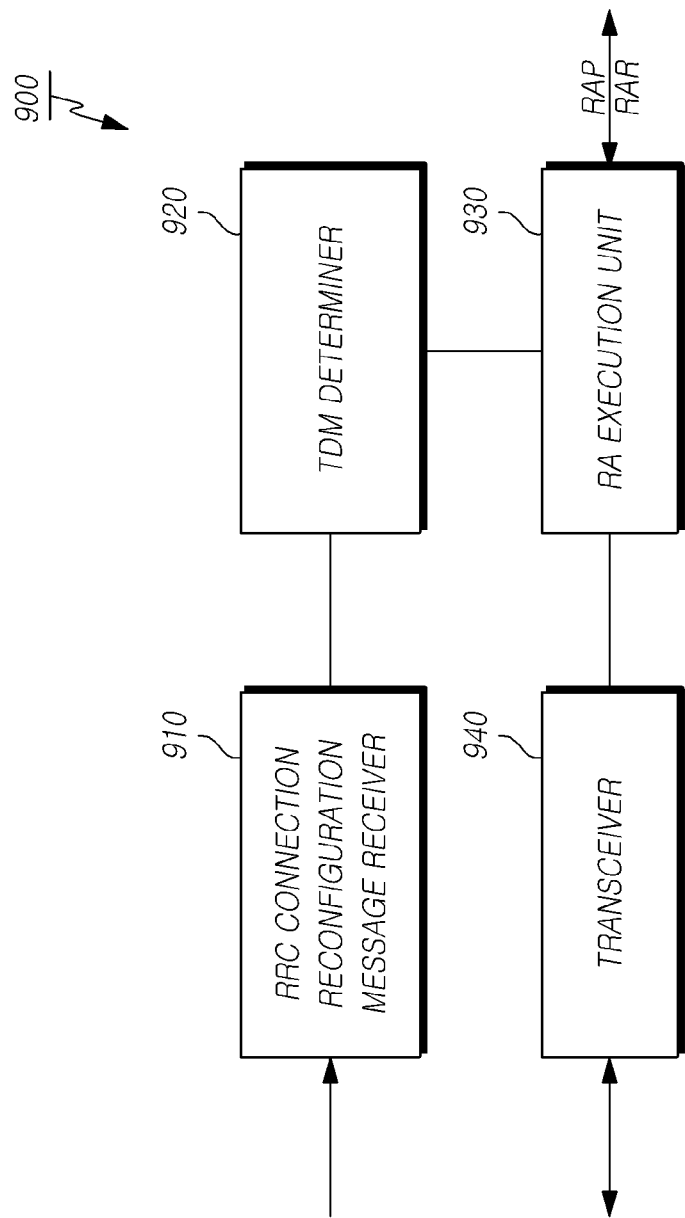
FIG. 9 is a block diagram of a UE according to an embodiment of the present invention.

FIG. 9 is a block diagram of a UE according to an embodiment of the present invention.

The UE 900 according to the present embodiment includes an RRC connection reconfiguration message receiver 910 for receiving an RRC connection reconfiguration message from the SeNB for handover, a TDM determiner 920 for determining whether the RRC connection reconfiguration message includes TDM information for avoiding in-UE coexistence interference, such as TDM pattern information or TDM activation information, a Random Access (RA) execution unit 930 for performing a random access with the TeNB, and a transceiver 940 for transmitting an RRC connection reconfiguration complete message to the TeNB and performing TDM-based data transmission and reception with the TeNB.

The TDM determiner 920 determines whether mobility control information of the RRC connection reconfiguration message received from the SeNB for the handover includes TDM information for avoiding in-UE coexistence interference, wherein the TDM information may be either specific TDM pattern information as shown in Table 2 and Table 3 or TDM activation information for indicating On/Off of the TDM operation. Of course, the TDM information may include both the TDM pattern information and the TDM activation information.

The RA execution unit 930 transmits a contention-free random access preamble to a corresponding TeNB.

When there is TDM pattern information included in the TDM information, the transceiver 940 receives an access grant message from the TeNB according to the corresponding TDM pattern. Further, the transceiver 940 generates an RRC connection reconfiguration complete message and transmits the generated RRC connection reconfiguration complete message to the TeNB, and then transmits or receives data to or from the TeNB according to the corresponding TDM pattern. As a result, the UE can perform an LTE signal transmission or reception while avoiding in-UE coexistence interference.

Further, when there is no TDM pattern information, the transceiver 940 performs a typical procedure for handover and data transmission or reception.

Figure 10:
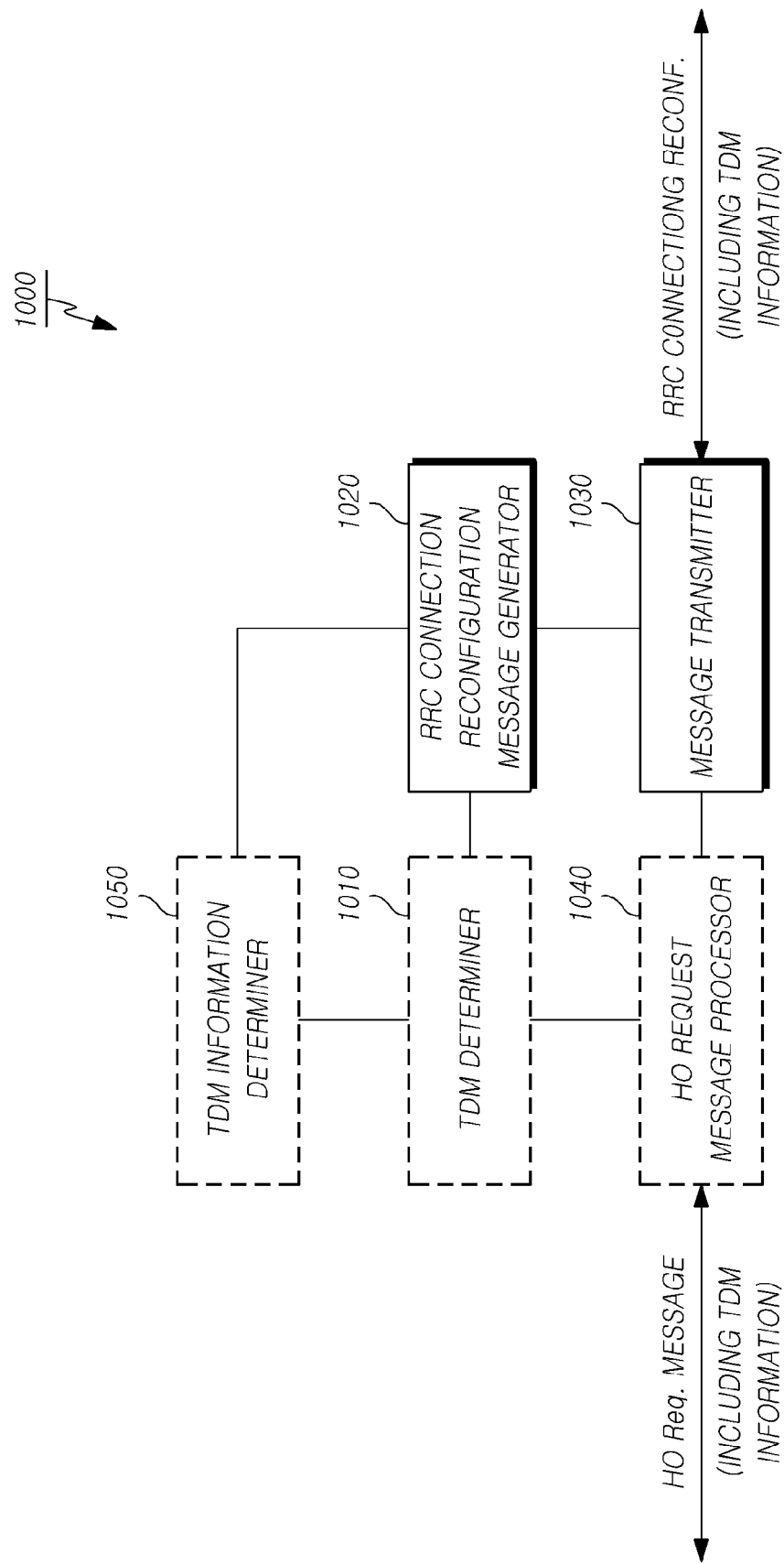
FIG. 10 is block diagram of an SeNB according to an embodiment of the present invention.

FIG. 10 is block diagram of an SeNB according to an embodiment of the present invention.

The SeNB 1000 according to the present embodiment is an apparatus for performing a handover capable of avoiding in-UE coexistence interference, and includes a TDM determiner 1010 for determining whether a TDM operation is necessary for the handover so as to avoid in-UE coexistence interference, an RRC connection reconfiguration message generator 1020 for, when it is determined that a TDM operation is necessary, generating an RRC connection reconfiguration message including TDM information, such as TDM pattern information or TDM activation information, and a message transmitter 1030 for transmitting the generated RRC connection reconfiguration message to the UE.

Also, the SeNB 1000 may further include a handover request message processor 1040 for generating a handover request message including TDM information and transmitting the generated handover request message to the TeNB.

Moreover, the SeNB 1000 may further include a TDM information determiner 1050 for determining information on a specific TDM pattern to be used during a handover between a particular UE and the TeNB.

The RRC connection reconfiguration message generator 1020 generates an RRC connection reconfiguration message which contains TDM pattern information or TDM activation information as shown Table 2 or Table 3 within a mobility control information element of the message.

Figure 11:
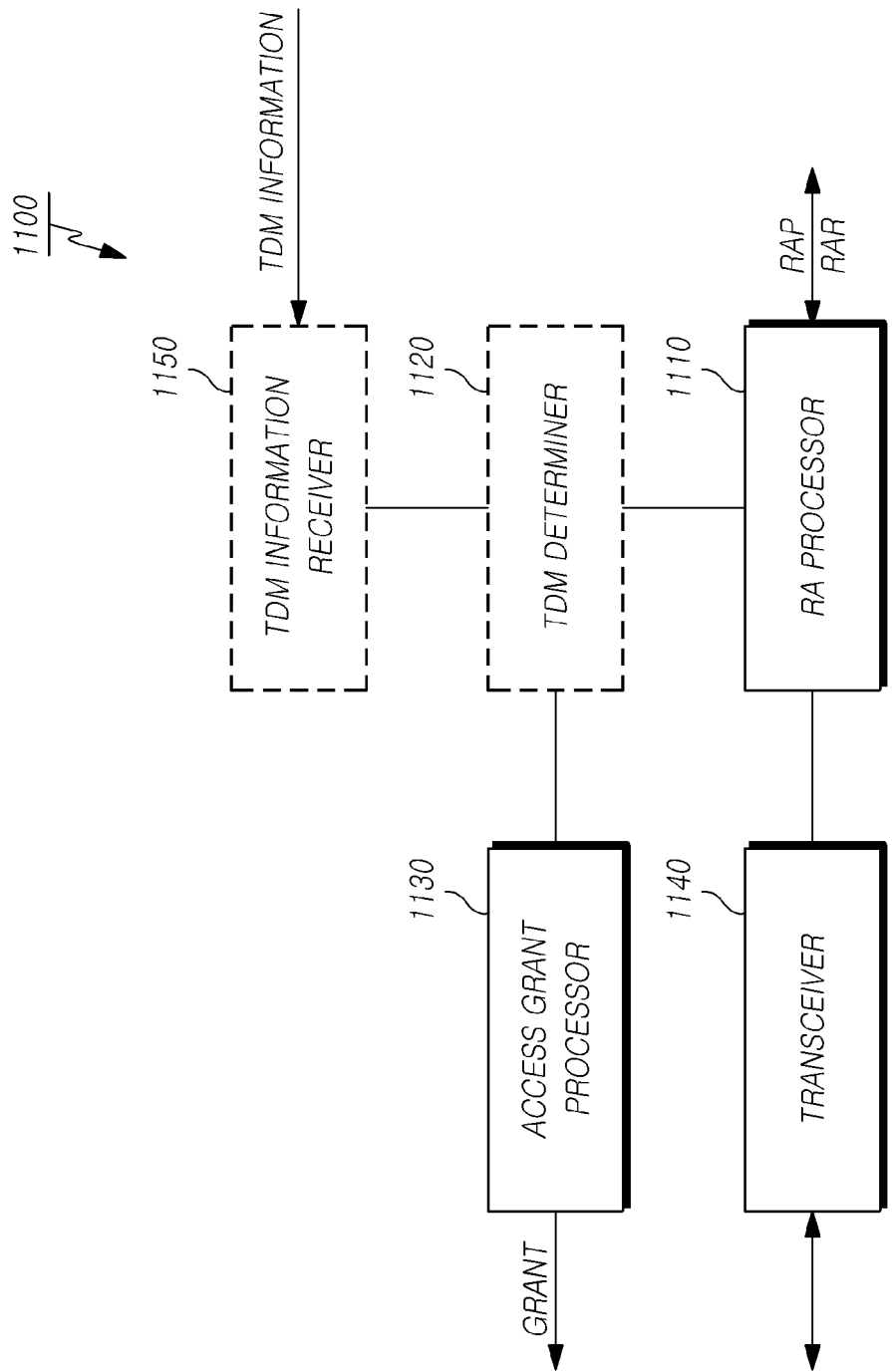
FIG. 11 is block diagram of a TeNB according to an embodiment of the present invention.

FIG. 11 is block diagram of a TeNB according to an embodiment of the present invention.

The TeNB 1100 according to the present embodiment is a target-side apparatus for performing a handover capable of avoiding in-UE coexistence interference, and includes an RA processor 1110 for receiving a contention-free random access preamble from a UE to be handovered, a TDM determiner 1120 for determining whether to perform a TDM operation between the TeNB and a corresponding UE, an access grant processor 1130 for generating an access grant message according to predetermined TDM information and transmitting the generated access grant message to the UE, and a transceiver 1140 for receiving an RRC connection reconfiguration complete message from the UE according to a predetermined TDM pattern and transmitting or receiving data according to the predetermined TDM pattern.

Further, if necessary, the TeNB may further include a TDM information receiver 1150 for receiving TDM information to be applied during the handover from the SeNB or the UE.

The TDM information receiver 1150 may receive the TDM information from the SeNB or the UE either when it receives a handover request message from the SeNB or through a separate signaling rather than receiving of the handover request message.

When the TeNB knows the TDM pattern to be applied during the handover of a particular UE or receives TDM pattern information from the SeNB or the UE, the TeNB performs the handover procedure and data transmission thereafter according to the TDM pattern.

According to the embodiments as described above, the SeNB transmits particular TDM information to the UE (and to the TeNB, too, if necessary), and the UE performs a handover operation with the TeNB according to a corresponding TDM pattern, so as to prevent handover failure due to the in-UE coexistence interference.

While the exemplary embodiments have been shown and described, it will be understood by those skilled in the art that various changes in form and details may be made thereto without departing from the spirit and scope of this disclosure as defined by the appended claims and their equivalents. Thus, as long as modifications fall within the scope of the appended claims and their equivalents, they should not be misconstrued as a departure from the scope of the invention itself.

The invention claimed is:

1. A method of performing a handover in a wireless communication system, the method comprising:
    establishing a wireless connection with a User Equipment (UE) via a first wireless communication system, the first wireless communication system corresponding to a mobile communication system including Long Term Evolution (LTE) system;
    transmitting a handover request message of the UE, which supports the first wireless communication system and a second wireless communication system, to a Target evolved Node-B (TeNB), by a Source evolved Node-B (SeNB), wherein the handover request message includes Time Division Multiplexing (TDM) information related to avoidance of In-Device Coexistence (IDC) interference of the UE, the IDC interference of the UE is an interference between the first wireless communication system and the second wireless communication system in the UE, and the TDM information includes a subframe pattern in a bitmap form comprising zero or one for each bit to indicate an unscheduled subframe or a scheduled subframe for the first wireless communication system, respectively;
    receiving a handover admission OK message from the TeNB, by the SeNB; and
    generating a Radio Resource Control (RRC) connection reconfiguration message for a handover and transmitting the RRC connection reconfiguration message for the handover to the UE, in order to enable the UE to perform the handover to the TeNB, by the SeNB,
    wherein systems of the SeNB and the TeNB are different from the second wireless communication system.

2. The method as claimed in claim 1, wherein the TDM information related to the avoidance of the IDC interference of the UE comprises Discontinuous Reception (DRX)-based TDM pattern information, and the DRX-based TDM pattern information comprises one or more of information on a pattern cycle, information on a length of a scheduled period, and information on a length of a unscheduled period.

3. The method as claimed in claim 2, wherein transmission of a signal by the first wireless communication system is prevented in the unscheduled period.

4. The method as claimed in claim 1, wherein the TDM information comprises information on a subframe pattern considering a Hybrid Automatic Repeat Request (HARQ) retransmission cycle in the first wireless communication system.

5. The method as claimed in claim 4, wherein the information on the subframe pattern considering the HARQ retransmission cycle comprises one or more of:
    information on a subframe in which HARQ-based transmission and reception in the first wireless communication system are performed; and
    information on a subframe in which transmission of a signal by the first wireless communication system is prevented.

6. The method as claimed in claim 1, wherein the first wireless communication system comprises a Long Term Evolution-Advanced (LTE-A) system, and the second wireless communication system is a communication system other than the LTE system and the LTE-A system.

7. The method as claimed in claim 6, wherein the second wireless communication system is an Industrial Scientific and Medical (ISM) system.

8. An apparatus of a Source evolved Node-B (SeNB), which performs an operation related to a handover of a User Equipment (UE) supporting a first wireless communication system and a second wireless communication system, the apparatus comprising:
    a transceiver; and
    a processor configured to:
        establish a wireless connection with a User Equipment (UE) via the first wireless communication system, the first wireless communication system corresponding to a mobile communication system including Long Term Evolution (LTE) system;
        control the transceiver to transmit a handover request message to a Target evolved Node-B (TeNB), and to receive a handover admission OK message from the TeNB, wherein the handover request message includes Time Division Multiplexing (TDM) information related to avoidance of In-Device Coexistence (IDC) interference of the UE, the IDC interference of the UE is an interference between the first wireless communication system and the second wireless communication system in the UE, and the TDM information includes a subframe pattern in a bitmap form comprising zero or one for each bit to indicate an unscheduled subframe or a scheduled subframe for the first wireless communication system, respectively;
        generate a Radio Resource Control (RRC) connection reconfiguration message for a handover; and
        control the transceiver to transmit the generated RRC connection reconfiguration message to the UE in order to enable the UE to perform the handover to the TeNB,
    wherein systems of the SeNB and the TeNB are different from the second wireless communication system.

9. The handover apparatus as claimed in claim 8, wherein the TDM information related to the avoidance of the IDC interference of the UE comprises Discontinuous Reception (DRX)-based TDM pattern information, and the DRX-based TDM pattern information comprises one or more of information on a pattern cycle, information on a length of a scheduled period, and information on a length of a unscheduled period.

10. The handover apparatus as claimed in claim 9, wherein transmission of a signal by the first wireless communication system is prevented in the unscheduled period.

11. The handover apparatus as claimed in claim 8, wherein the TDM information comprises information on a subframe pattern considering a Hybrid Automatic Repeat Request (HARQ) retransmission cycle in the first wireless communication system.

12. The handover apparatus as claimed in claim 11, wherein the information on the subframe pattern considering the HARQ retransmission cycle comprises one or more of:

information on a subframe in which HARQ-based transmission and reception in the first wireless communication system are performed; and information on a subframe in which transmission of a signal by the first wireless communication system is prevented.

13. The handover apparatus as claimed in claim 8, wherein the first wireless communication system comprises a Long Term Evolution-Advanced (LTE-A) system, and the second wireless communication system is a communication system other than the LTE system and the LTE-A system.

\* \* \* \* \*